(12) United States Patent
Rentschler et al.

(10) Patent No.: US 11,876,616 B2
(45) Date of Patent: *Jan. 16, 2024

(54) CHANGING A MASTER NODE IN A WIRED LOCAL AREA NETWORK AND RELATED SYSTEMS, METHODS, AND DEVICES

(71) Applicant: Microchip Technology Incorporated, Chandler, AZ (US)

(72) Inventors: Michael Rentschler, Baden-Wuerttemberg (DE); Martin Miller, Baden-Wuerrttemburg (DE); Thorben Link, Baden-Wuerttemberg (DE); Venkat Iyer, Austin, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/815,521

(22) Filed: Jul. 27, 2022

(65) Prior Publication Data

US 2022/0368451 A1 Nov. 17, 2022

Related U.S. Application Data

(63) Continuation of application No. 16/749,695, filed on Jan. 22, 2020, now Pat. No. 11,405,127.

(Continued)

(51) Int. Cl.
*H04L 1/00* (2006.01)
*H04L 41/0816* (2022.01)
(Continued)

(52) U.S. Cl.
CPC ........ *H04L 1/0002* (2013.01); *H04L 41/0816* (2013.01); *H04L 41/12* (2013.01);
(Continued)

(58) Field of Classification Search
CPC ....... H04L 1/0002; H04L 1/0816; H04L 1/12; H04L 67/1048; H04L 67/1051; H04L 67/1063; H04L 69/323
See application file for complete search history.

(56) References Cited

U.S. PATENT DOCUMENTS 6,298,376 B1   10/2001   Rosner et al.
6,363,416 B1    3/2002   Naeimi et al.
(Continued)

FOREIGN PATENT DOCUMENTS

CN   103124421 A   5/2013
CN   105592432 A   5/2016
(Continued)

OTHER PUBLICATIONS

German Office Action from German Application No. 112020002093.2, dated Mar. 25, 2022, 61 pages.

(Continued)

*Primary Examiner* — Eric Nowlin
(74) *Attorney, Agent, or Firm* — TraskBritt

(57) ABSTRACT

Various examples relate to a wired local area network (WLAN) including a shared transmission medium. An apparatus includes a beacon counter and an operational mode controller. The beacon counter is operably coupled to a line of a shared transmission medium of a wired local area network. The beacon counter is to count beacon signals on the line and determine a beacon count over a predetermined time period, or a beacon rate of the beacon signals. The operational mode controller is to control the apparatus to take over operation as a master node of the wired local area network based, at least in part, on a maximum bus cycle length of bus cycles on the line and responsive to the beacon count or the beacon rate.

20 Claims, 11 Drawing Sheets

Related U.S. Application Data

(60) Provisional application No. 62/838,750, filed on Apr. 25, 2019.

(51) Int. Cl.
| | |
|---|---|
| *H04L 41/12* | (2022.01) |
| *H04L 67/104* | (2022.01) |
| *H04L 67/1061* | (2022.01) |
| *H04L 69/323* | (2022.01) |

(52) U.S. Cl.
CPC ...... *H04L 67/1048* (2013.01); *H04L 67/1051* (2013.01); *H04L 67/1063* (2013.01); *H04L 69/323* (2013.01)

(56) References Cited

U.S. PATENT DOCUMENTS

| | | | |
|---|---|---|---|
| 6,397,133 | B1 | 5/2002 | Van et al. |
| 6,983,317 | B1 | 1/2006 | Bishop et al. |
| 7,039,694 | B2 | 5/2006 | Kampe et al. |
| 7,389,332 | B1 | 6/2008 | Muchow et al. |
| 7,457,620 | B2 | 11/2008 | Lam et al. |
| 7,580,697 | B2 | 8/2009 | Lappe et al. |
| 7,587,465 | B1 | 9/2009 | Muchow |
| 8,583,773 | B2 | 11/2013 | Pafumi et al. |
| 9,055,425 | B2 | 6/2015 | Luukkala et al. |
| 9,578,635 | B2 | 2/2017 | Vannithamby et al. |
| 9,729,638 | B2 | 8/2017 | Kulnick et al. |
| 9,730,041 | B2 | 8/2017 | Choi |
| 9,867,009 | B2 | 1/2018 | Mycek et al. |
| 9,872,146 | B2 | 1/2018 | Mycek et al. |
| 9,966,645 | B1 | 5/2018 | Papp et al. |
| 10,003,361 | B2 | 6/2018 | Kim |
| 10,009,729 | B2 | 6/2018 | Mycek et al. |
| 10,057,750 | B2 | 8/2018 | Gellens |
| 10,122,621 | B2 | 11/2018 | Schreter |
| 10,142,786 | B2 | 11/2018 | Mycek et al. |
| 10,271,269 | B2 | 4/2019 | Van et al. |
| 10,412,568 | B2 | 9/2019 | Kaindl et al. |
| 10,565,227 | B1 | 2/2020 | Chen et al. |
| 10,863,451 | B2 | 12/2020 | Cenanovic et al. |
| 10,868,765 | B2* | 12/2020 | Sostawa ............... H04L 47/24 |
| 10,925,097 | B2 | 2/2021 | Beruto et al. |
| 10,999,099 | B2 | 5/2021 | Pannell |
| 11,171,807 | B2* | 11/2021 | Yun .......................... H04L 12/12 |
| 2004/0039503 | A1 | 2/2004 | Doyle |
| 2005/0096007 | A1 | 5/2005 | Lappe et al. |
| 2007/0014267 | A1 | 1/2007 | Lam et al. |
| 2008/0254746 | A1* | 10/2008 | Krishnan ............ H04M 1/6091 |
| | | | 455/66.1 |
| 2008/0284665 | A1 | 11/2008 | Pfletschinger et al. |
| 2012/0284441 | A1 | 11/2012 | Landman et al. |
| 2014/0087680 | A1 | 3/2014 | Luukkala et al. |
| 2014/0092833 | A1 | 4/2014 | Vannithamby et al. |
| 2014/0101477 | A1* | 4/2014 | Patterson ................ G06F 1/263 |
| | | | 713/340 |
| 2015/0111517 | A1 | 4/2015 | Kowalewski et al. |
| 2016/0029197 | A1 | 1/2016 | Gellens |
| 2016/0087655 | A1 | 3/2016 | Kim |
| 2016/0135028 | A1 | 5/2016 | Choi |
| 2016/0242101 | A1 | 8/2016 | Van et al. |
| 2017/0034278 | A1 | 2/2017 | Kulnick et al. |
| 2017/0280291 | A1 | 9/2017 | Mycek et al. |
| 2017/0280298 | A1 | 9/2017 | Mycek et al. |
| 2018/0034658 | A1 | 2/2018 | Kinage et al. |
| 2018/0103346 | A1 | 4/2018 | Mycek et al. |
| 2018/0103347 | A1 | 4/2018 | Mycek et al. |
| 2018/0108961 | A1 | 4/2018 | Papp et al. |
| 2019/0173739 | A1 | 6/2019 | Cui et al. |
| 2019/0230705 | A1 | 7/2019 | Beruto et al. |
| 2019/0261420 | A1 | 8/2019 | Pannell et al. |
| 2020/0064131 | A1* | 2/2020 | Seymour ................ G06F 16/29 |
| 2020/0084833 | A1 | 3/2020 | Kwan et al. |
| 2020/0136857 | A1* | 4/2020 | Yun ................... H04L 12/40039 |
| 2020/0136993 | A1 | 4/2020 | Yun et al. |
| 2020/0295957 | A1 | 9/2020 | Kim et al. |
| 2020/0351796 | A1 | 11/2020 | Cenanovic et al. |
| 2021/0203066 | A1 | 7/2021 | Kim et al. |
| 2021/0377343 | A1* | 12/2021 | Kim ........................ H04L 12/40 |

FOREIGN PATENT DOCUMENTS

| | | |
|---|---|---|
| CN | 106160887 A | 11/2016 |
| CN | 206416931 U | 8/2017 |
| CN | 206421568 U | 8/2017 |
| CN | 108770035 A | 11/2018 |
| CN | 105553805 B | 4/2019 |
| CN | 111711526 A | 9/2020 |
| DE | 102009012628 A1 | 9/2010 |
| DE | 102015221965 A1 | 5/2016 |
| DE | 102016200105 A1 | 7/2016 |
| EP | 2790461 A1 | 10/2014 |
| EP | 2869659 A1 | 5/2015 |
| EP | 2244526 B1 | 2/2016 |
| EP | 3001708 A2 | 3/2016 |
| ES | 1091107 U | 10/2013 |
| FR | 2887064 A1 | 12/2006 |
| JP | 02-060100 B2 | 12/1990 |
| JP | 2021525473 A * | 9/2021 |
| KR | 10-2000-0050944 A | 8/2000 |
| KR | 10-1589214 B1 | 1/2016 |
| KR | 10-1601534 B1 | 3/2016 |
| KR | 10-2017-0045509 A | 4/2017 |
| KR | 20210147495 A * | 12/2021 |
| WO | 01/55676 A1 | 8/2001 |
| WO | 03/42943 A3 | 10/2003 |
| WO | 2015/062693 A1 | 5/2015 |
| WO | WO-2019226585 A1 * | 11/2019 ......... H04L 12/4015 |
| WO | WO-2022046962 A1 * | 3/2022 ......... H04L 12/413 |

OTHER PUBLICATIONS

International Search Report from International Application No. PCT/US2020/014627, dated Apr. 15, 2020, 5 pages.

International Written Opinion from International Application No. PCT/US2020/014627, dated Apr. 15, 2020, 13 pages.

Keating et al., An Industrial Application of Model Checking to a Vessel Control System, Jan. 17, 2011, 2011 Sixth IEEE International Symposium on Electronic Design, Test and Application, pp. 83-88, doi: 10.1109/DELTA.2011.24. (Year: 2011).

Meier, Alexander, "Analysis of Worst Case Latencies in an 10 Mbit Ethernet Network with PLCA", Jan. 17, 2018, (V4), pp. 1-11, XP68146695A.

Zimmerman et al., "IEEE P802.3cg 10Mb/s Single Pair Ethernet: A Guide", Long Beach, CA, USA, Jan. 16, 2019, pp. 1-40.

* cited by examiner

CHANGING A MASTER NODE IN A WIRED LOCAL AREA NETWORK AND RELATED SYSTEMS, METHODS, AND DEVICES

CROSS-REFERENCE TO RELATED APPLICATIONS

This application is a continuation of U.S. patent application Ser. No. 16/749,695, filed Jan. 22, 2020, now U.S. Pat. No. 11,405,127, issue Aug. 2, 2022, which claims priority to U.S. Provisional Patent Application No. 62/838,750, which was filed on Apr. 25, 2019, the entire disclosure of each of which is hereby incorporated herein by this reference.

TECHNICAL FIELD

The present disclosure relates, generally, to management of node mastership in a network, and more specifically to changing of a master node in a wired local area network.

BACKGROUND

Various interface standards for connecting computers and external peripherals may be used to provide connectivity at high speeds. A widely used, flexible networking standard for connecting computers (e.g., in Local Area Networks (LANs) and Wide Area Networks (WANs)) is the Ethernet protocol. Ethernet communication generally refers to point-to-point communication within a network of multiple end points. Ethernet generally makes efficient use of shared resources, is easy to maintain and reconfigure, and is compatible across many systems.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
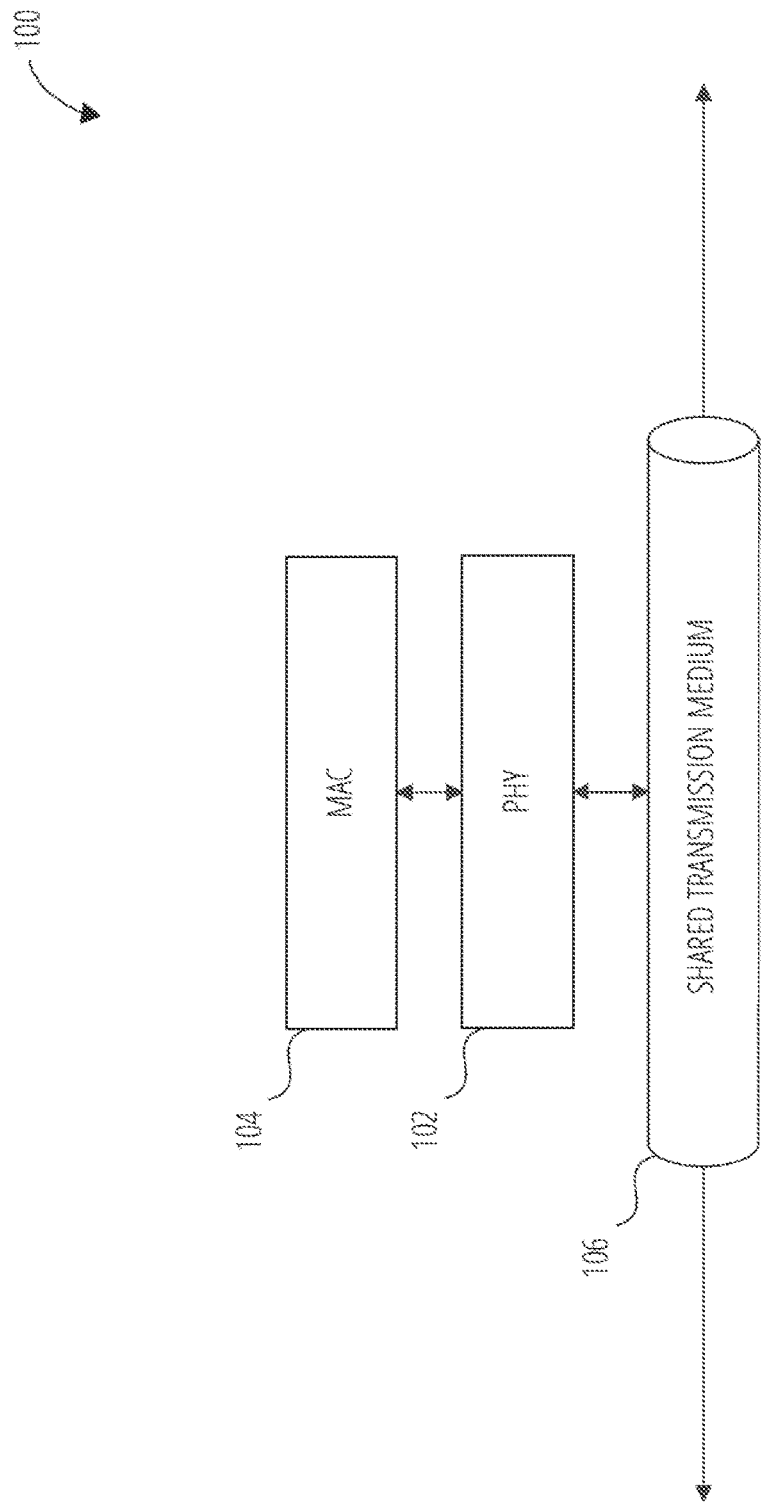
FIG. 1 is a functional block diagram of a network segment, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

A vehicle, such as an automobile, a truck, a bus, a ship, and/or an aircraft, may include a vehicle communication network. The complexity of a vehicle communication network may vary depending on a number of electronic devices within the network. For example, an advanced vehicle communication network may include various control modules for, for example, engine control, transmission control, safety control (e.g., antilock braking), and emissions control. To support these modules, the automotive industry relies on various communication protocols.

10SPE (i.e., 10 Mbps Single Pair Ethernet) is a network technology currently under specification development as IEEE 802.3cg™. 10SPE may be used to provide a collision free, deterministic transmission on a multi-drop network. The 10SPE specification intends to include an optional physical level collision avoidance (PLCA) reconciliation sublayer, which is used to avoid physical collision on a multi-drop bus. PLCA relies on a master node, i.e., a PLCA master node, that sends out a beacon that starts a bus cycle, which is shared among multi-drop nodes in a round robin fashion. However, if the master node fails, all traffic on a bus comes to a halt and the bus becomes unusable. Further, the 10SPE specification under development does not presently provide a means to dynamically change a master of a network. The term "master node" refers to a node with node identification of zero (0), and the term "slave node" refers to a node with node identification greater than zero (0).

Various embodiments relate to changing a master node of a network, and more specifically to enabling a fallback master node in a network (e.g., a wired local area network such as a 10SPE network). More specifically, various embodiments may relate to disabling a master node of the network (e.g., in response to one or more events and/or conditions) and replacing the previous master node with a new master node (e.g., in response to a detection that the master node is not transmitting beacons at an adequate frequency). In other words, a first node, which is operating as a master node may fail and/or may be disabled (e.g., for one or more reasons such as a triggering of an airbag during a vehicle collision), and another node, which was previously operating as a slave node, may become the master node.

In some embodiments, a physical layer (PHY) (e.g., of a slave node) may implement a beacon counter. Firmware of the PHY may periodically read the beacon counter. If there is no change to a count of the beacon counter (or the count is less than an expected (e.g., threshold)) count, it may be determined that the master node is disabled, broken, and/or lost. In this case, a fallback master node may be enabled (e.g., via firmware), and the network may be resynced.

In some embodiments, a 10SPE PHY device may be used with a microcontroller unit (MCU) configured to write to and/or read from the 10SPE PHY device using a management data input/output (MDIO) interface. According to various embodiments, a slave node on a multi-drop network may maintain a count (e.g., via a counter) of beacons sent out by a master node. Further, in some embodiments, firmware (FW) (e.g., in an MCU) may poll (e.g., periodically read) the value of the counter. According to some embodiments, the firmware may infer that the master node has failed if the count value does not change at an expected rate.

In some embodiments, if it is determined that the master node has failed and/or the master node is disabled, firmware at a designated fallback master node (e.g., a slave node) makes its PHY the PLCA master node. Further, the fallback master node may restart transmission of beacons on the bus so that bus traffic can resume. To change master nodes, the firmware at the current master node may cause the PHY of the current master to stop its beacons (e.g., in response to a detection of an event such as a vehicle collision, which may be signaled to the master node when an airbag is deployed). This eventually causes the designated fallback master to take over as the master node.

For example, if an emergency call (eCall) node is a fallback master node, the mastership may be handed over to the eCall node. This might be needed, for example, when a crash (e.g., a crash involving a vehicle including a 10SPE network) is detected (e.g., responsive to deployment of an airbag). Various embodiments may be used to support eCall in response to detecting a crash (e.g., of a vehicle including a 10SPE network). For example, master firmware disables the master node (e.g., a network node implemented in an amplifier device) of the network. Further, firmware of an eCall master node (e.g., firmware of a network node implemented in an antenna or a microphone) may detect the lack of increase in a beacon count and resync a network by issuing beacons. The eCall device (e.g., microphone) may be used to request assistance.

In some embodiments, firmware may control one or more (e.g., each) acts of a master change/exchange. Alternatively or additionally, one or more acts of a change/exchange may be controlled by hardware.

The 10SPE specification under development presently includes a timer (e.g., in one or more nodes of a network) that may cause nodes to go inactive (i.e., a timeout) after a certain period of time has passed without an occurrence of a beacon. According to various embodiments, in response to one or more timeouts, a fallback master node may assume the master role and resynchronize the bus. In these embodiments, it may not be necessary for one or more messages to be exchanged between a master node and a fallback master node during a master change/exchange, and therefore, a network may be more robust.

Various embodiments of the present disclosure are now explained with reference to the accompanying drawings.

FIG. 1 is a functional block diagram of a network segment 100 including a link layer device, MAC 104 and a physical layer (PHY) device, PHY 102, according to some embodiments. As non-limiting examples, network segment 100 may be a segment of a multidrop network, a segment of a multidrop sub-network, a segment of a mixed media network, or a combination thereof or sub combination thereof. As non-limiting examples, network segment 100 may be, be part of, or include one or more of a microcontroller-type embedded system, a user-type computer, a computer server, a notebook computer, a tablet, a handheld device, a mobile device, a wireless earbud device or headphone device, a wired earbud or headphone device, an appliance sub-system, lighting sub-system, sound sub-system, building control systems, residential monitoring system (e.g., for security or utility usage, without limitation) system, elevator system or sub-system, public transit control system (e.g., for above ground train, below ground train, trolley, or bus, without limitation), an automobile system or automobile sub-system, or an industrial control system, without limitation.

PHY 102 may be configured to interface with MAC 104. As non-limiting examples, PHY 102 and/or MAC 104 may be chip packages including memory and/or logic configured for carrying out all or portions of embodiments described herein. As non-limiting examples, PHY 102 and MAC 104, respectively, may be implemented as separate chip packages or circuitry (e.g., integrated circuits) in a single chip package (e.g., a system-in-a-package (SIP)).

PHY 102 also interfaces with shared transmission medium 106, a physical medium that is a communication path for nodes that are part of network segment 100 or a network of which network segment 100 is a part, including nodes that include respective instances of PHY 102 and MAC 104. As a non-limiting example, shared transmission medium 106 may be a single twisted pair such as used for single pair Ethernet. Devices that are on a baseband network (e.g., a multidrop network without limitation) share the same physical transmission medium, and typically use the entire bandwidth of that medium for transmission (stated another way, a digital signal used in baseband transmission occupies the entire bandwidth of the media). As a result, only one device on a baseband network may transmit at a given instant. So, media access control methods are used to handle contention for shared transmission medium 106.

In some embodiments a network node associated with the PHY 102 and the MAC 104 may be configured to operate as a master node configured to administer network level tasks for the network. For example, the network node may be configured to transmit beacon signals on the shared transmission medium 106 at the beginning of bus cycles, as discussed with reference to FIG. 2, FIG. 3, and FIG. 4. Also, the network node may be configured to operate as a slave node in the network while another network node operably coupled to the shared transmission medium 106 operates as the master node. The network node may be configured to operate as a backup master node in the event that a failure or loss of the master node occurs. The network node may be configured to detect the failure or loss of the master node (e.g., while operating as the slave node). In some embodiments, while the network node is operating as a master node, the network node may terminate its operation as the master node responsive to an event such as a vehicle collision or a determination that a failure has occurred in its operation as the master node, and another network node operably coupled to the shared transmission medium 106 may assume operation as the master node responsive to detecting a lack of beacons signaled on the shared transmission medium 106. In some embodiments, while the network node is operating as a slave node, the network node may assume operation as the master node responsive to a determination that a failure or loss of the master node has occurred (e.g., responsive to detecting a lack of beacons signaled on the shared transmission medium 106).

Figure 2:
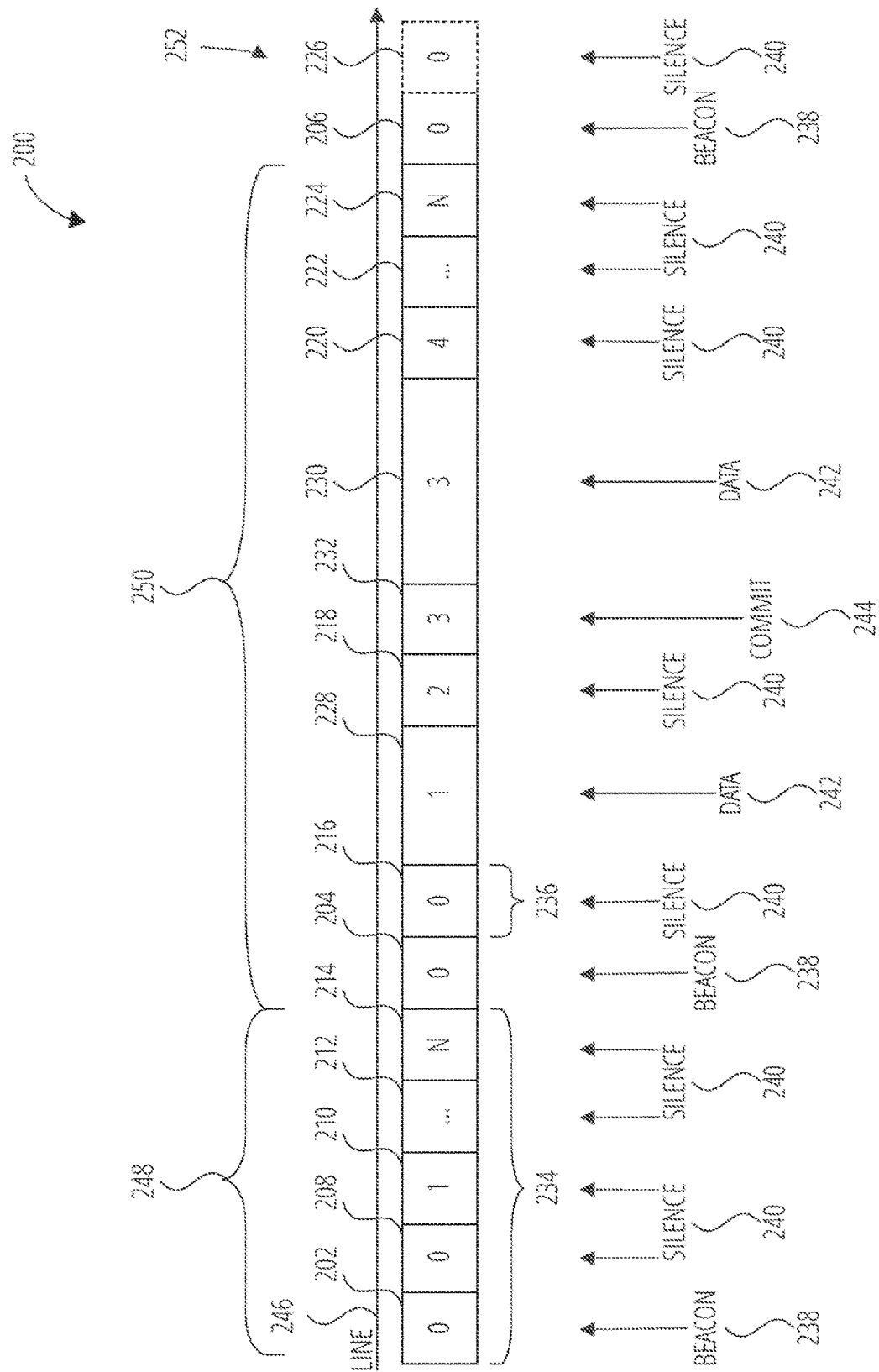
FIG. 2 depicts a number of bus cycles for a line of a physical level collision avoidance (PLCA) sublayer, according to some embodiments.

FIG. 2 depicts a number of bus cycles 200 for a line 246 (e.g., the shared transmission medium 106 of FIG. 1) of a physical level collision avoidance (PLCA) sublayer, according to some embodiments. Specifically, FIG. 2 illustrates a first bus cycle 248 and a second bus cycle 250. The bus cycles 200 include a plurality of time slots 252 (e.g., time slot 202 through time slot 232) of the line 246. The time slots 252 are each labeled with a number (e.g., 0, 1, 2, 3, 4, N, the number N being a number one less than a number of network nodes) corresponding to one of various network nodes (e.g., node 0, node 1, node 2, node 3, node 4, . . . node N) that is to communicate during the respective one of the time slots 252. Also, FIG. 2 indicates whether the communication in each of the bus cycles 200 includes a beacon 238, silence 240, data 242, or a commit signal 244. For example, as shown in FIG. 2, a beacon 238 may be sent by a node 0 (e.g., a master node) during each of time slot 202, time slot 204, and time slot 206. Also, silence 240 may be present on the line 246 during each of time slot 208 through time slot 226 (i.e., data is not transmitted during time slot 206 through time slot 226). Further, in time slot 232 a commit signal 244 may be sent (i.e., by a node 3 to, for example, capture the bus before sending a packet of data 242). Data 242 may be sent during time slot 228 and time slot 230. More specifically, a node 1 may send data 242 during time slot 228, and a node 3 may send data 242 during time slot 230.

During each of the bus cycles 200, the master node (node 0) may send out a beacon 238, which is followed by one or more time slots 252 for each of the nodes (node 0 through node N). As shown in FIG. 2, the first bus cycle 248 includes the time slot 202 having the beacon 238 transmitted by node 0, then silence 240 for time slot 208 through time slot 214 during which node 0 through node N remain silent (i.e., silence 240 during time slot 208 corresponding to node 0, time slot 210 corresponding to node 1, time slots 212 corresponding to nodes 2 to N−1, and time slot 214 corresponding to node N). It should be noted that where each of the nodes take only a minimum time slot length 236 during the bus cycle, as is the case with first bus cycle 248, the bus cycle will have a minimum bus cycle length 234.

After the first bus cycle 248 the second bus cycle 250 may occur. During the second bus cycle 250 the master node (e.g., node 0) may send out beacon 238 during time slot 204, then silence 240 during time slot 216 of minimum time slot length 236 corresponding to node zero. The second bus cycle 250 includes data 242 transmitted by node 1 during time slot 228, then silence 240 for time slot 218 corresponding to node 2. At time slot 232 the second bus cycle 250 includes an idle signal 244 (e.g., to capture the bus before sending a packet of data 242) followed by time slot 230 carrying data 242, the idle signal 244 and data 242 transmitted by node 3. The second bus cycle 250 further includes silence 240 transmitted during time slot 220 corresponding to node 4, time slots 222 corresponding to nodes 5 to node N−1, and time slot 224 corresponding to node N. An additional beacon 238 at time slot 206 and individual node transmissions starting with node zero at time slot 226 then follows second bus cycle 250.

Figure 3:
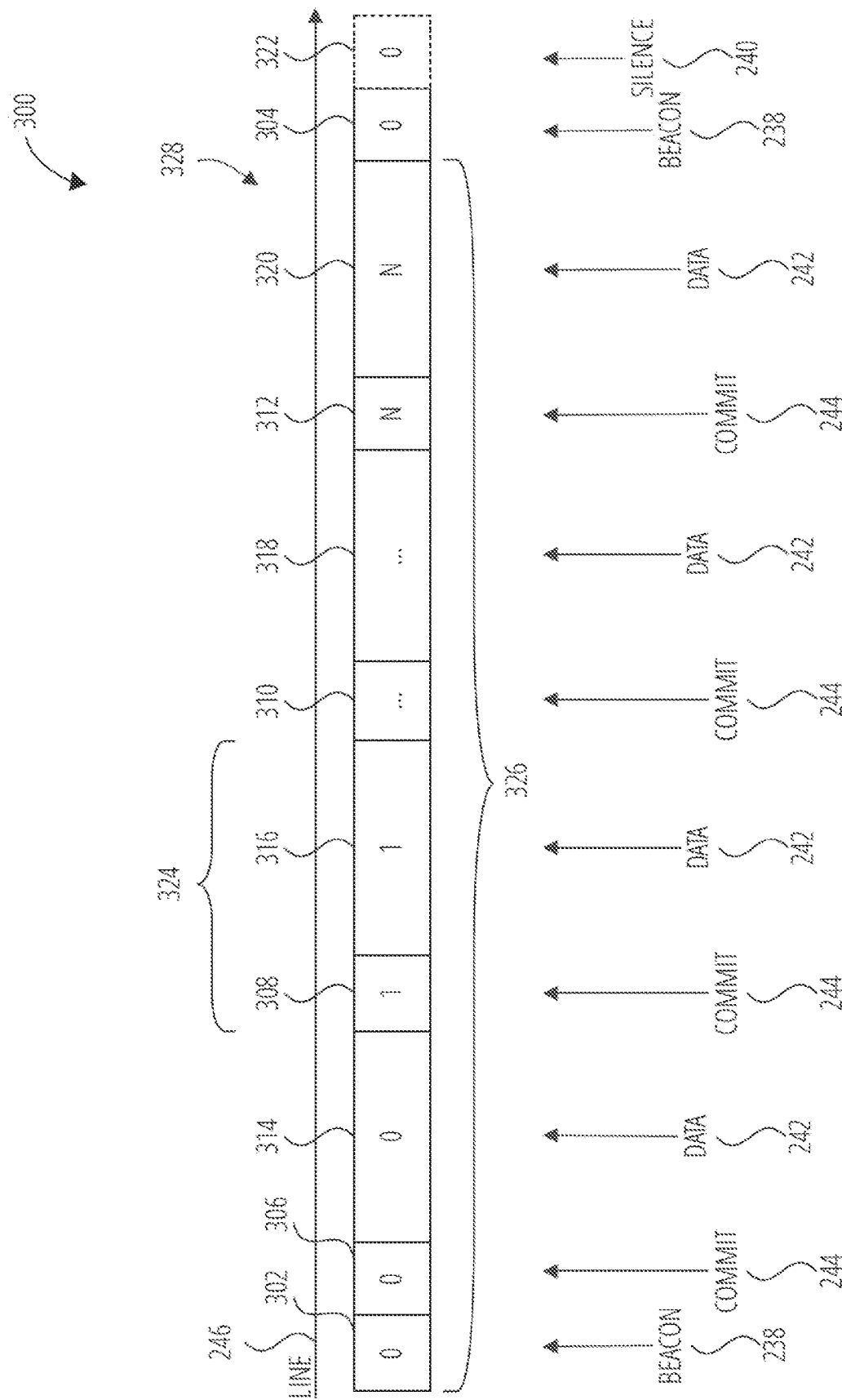
FIG. 3 depicts another bus cycle for a line of a PLCA sublayer, according to some embodiments.

FIG. 3 depicts another bus cycle 300 for a line 246 of a PLCA sublayer, according to some embodiments. Similar to the bus cycles 200 of FIG. 2, the bus cycle 300 includes time slots 328 marked to indicate nodes and content of the time slots 328. The bus cycle 300 includes a beacon 238 signaled in time slot 302 by a master node (e.g., node 0), an idle signal 244 signaled in time slot 306 and data 242 signaled in time slot 314 by node 0. The bus cycle 300 also includes a commit signal 244 signaled in time slot 308 and data 242 signaled in time slot 316 by node 1. The bus cycle 300 further includes a commit signal 244 and data 242 signaled in time slots 310 and time slots 318, respectively, by each of nodes 2 through N−1. Finally, bus cycle 300 includes a commit signal 244 and data 242 signaled in time slot 312 and time slot 320, respectively, by node N. FIG. 3 also shows a time slot 304 and a time slot 322 transmitting a beacon 238 and silence 240, respectively, of a bus cycle following the bus cycle 300.

FIG. 3 illustrates a maximum bus cycle length 326 wherein a beacon 238 is sent at a start of each cycle, and each node sends a commit signal 244 and data 242. Assuming that each combination of commit signal 244 and data 242 transmitted by nodes 1-N has a maximum time slot length 324, a duration of the bus cycle 300 is a maximum bus cycle length 326. Accordingly, if a number of nodes is known, both a minimum bus cycle length 234 (FIG. 2) and a maximum bus cycle length 326 (FIG. 3) may be determined.

Since each bus cycle is accompanied by one beacon 238, a number of beacon 238 signals may be counted over time and a determination may be made as to whether a number of counted beacon 238 signals is consistent with the minimum bus cycle length 234 and the maximum bus cycle length 326. For example, if the counted number of beacon 238 signals counted over a given period of time is less than a number of bus cycles having the maximum bus cycle length 326 that would fit within the given period of time, it may be determined that a problem has occurred. Accordingly, a fallback master node may take over as master node (e.g., without intervention by the previous master node).

Figure 4:
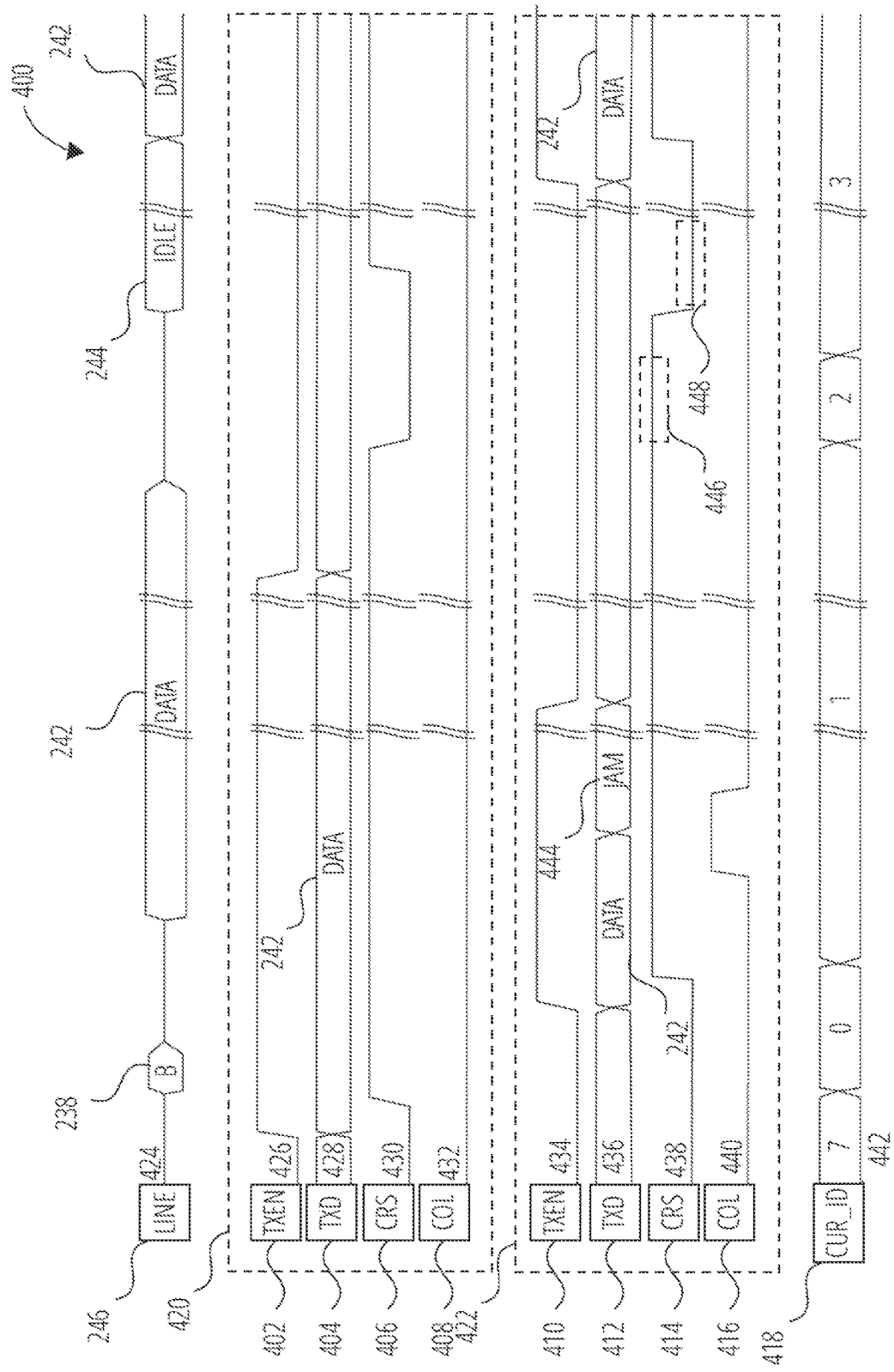
FIG. 4 illustrates a signal timing diagram associated with a second bus cycle shown in FIG. 2, according to some embodiments.

FIG. 4 illustrates a signal timing diagram 400 associated with the second bus cycle 250 (e.g., of the PLCA sublayer) shown in FIG. 2, according to some embodiments. The signal timing diagram 400 illustrates line signals 424 on the line 246 of FIG. 2, node 1 signals 420, node 3 signals 422, and current node identification signals (CUR_ID signals 442) on a CUR_ID line 418. The node 1 signals 420 include transmit enable signals (TXEN signals 426) on a TXEN line 402, transmit data signals (TXD signals 428) on a TXD line 404, carrier sense signals (CRS signals 430) on a CRS line 406, and collision detect signals (COL signals 432) on a COL line 408. Similarly, the node 3 signals 422 include TXEN signals 434 on a TXEN line 410, TXD signals 436 on a TXD line 412, CRS signals 438 on a CRS line 414, and COL signals 440 on a COL line 416. The CUR_ID signals 442 indicate an identification indicating which of the nodes (e.g., node 0 through node 7) is designated to transmit data 242 on the line 246.

As illustrated in FIG. 4, following a previous bus cycle (e.g., first bus cycle 248) finishing with a node 7 designated by the CUR_ID signals 442 on the CUR_ID line 418, node 0 sends a beacon 238 on the line 246. Following a designation by the CUR_ID signals 442 on the CUR_ID line 418 of node 0 to transmit on the line 246, the CUR_ID signals 442 indicates node 1, and node 1 sends data 242 on the line 246. While node 1 is sending the data 242 on the line 246, node 3 attempts to send data 242 on the line 246. Since node 1 is currently sending data 242 on the line 246, however, a logical collision results (i.e., COL signals 440 associated with node 3 transitions high and a jam signal 444 is asserted in the TXD signals 436 of TXD line 412). While the CRS signal 438 of the CRS line 414 of node 3 remain high, node 1 finishes sending the data 242 on the line 246, and the CUR_ID signals 442 then indicates node 2. Subsequently, the CUR_ID signals 442 indicate node 3. Subsequently, the CRS signals 438 of the node 3 signals 422 transition from high 446 to low 448, after which node 3 may send an idle signal 244 and data 242 on the line 246.

Figure 5:
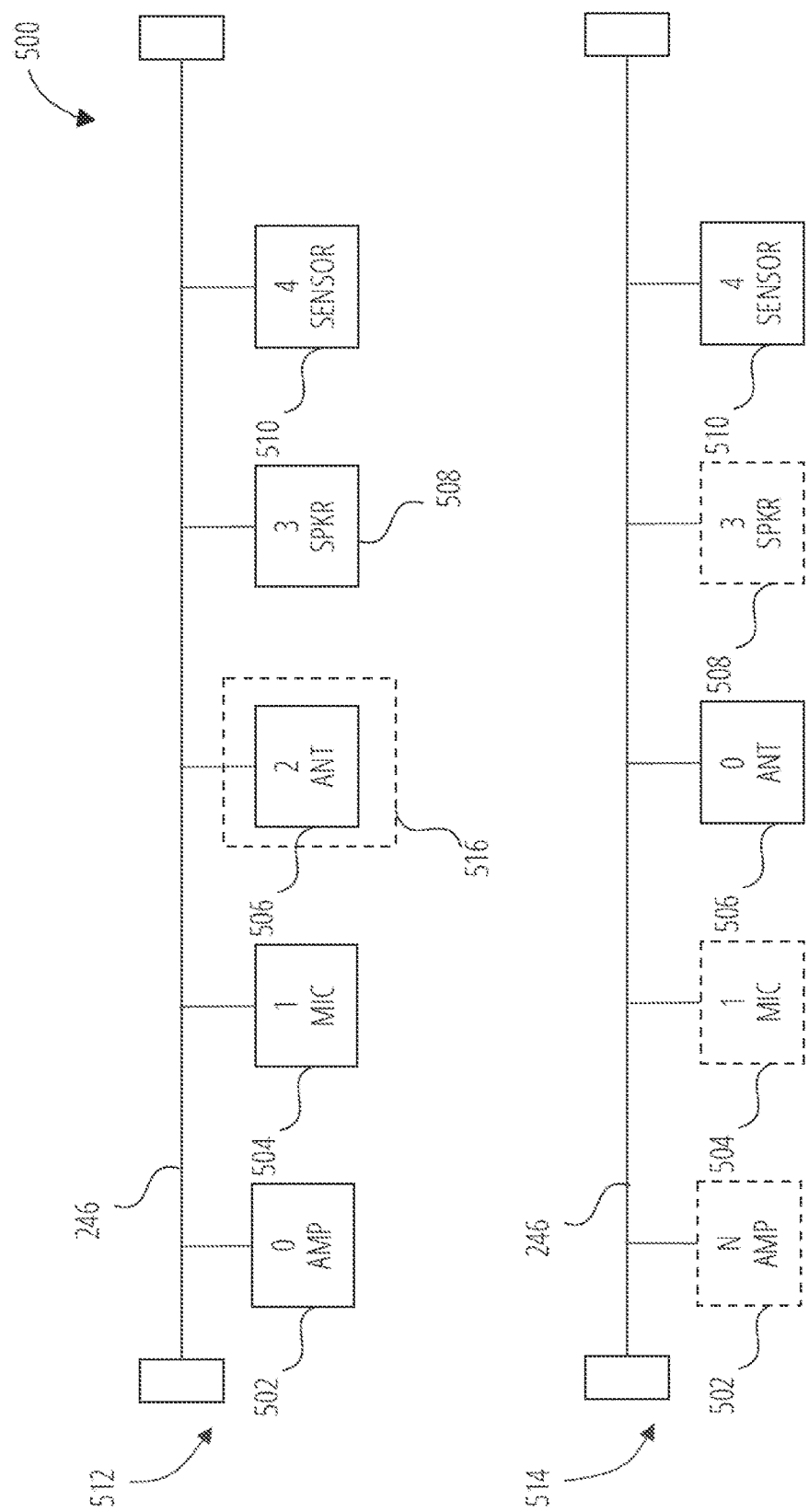
FIG. 5 depicts a network including a number of nodes.

FIG. 5 depicts a network 500 including a number of nodes (node 502, node 504, node 506, node 508, and node 510), according to some embodiments. In this example, node 502 includes an amplifier, node 504 includes a microphone, node 506 includes an antenna, node 508 includes a speaker, and node 510 includes a sensor. Further, in a first state 512, node 502, which is an amplifier, may be operating as a master node (node 0). Further, upon at least one event (e.g., an accident, which may be signaled by deployment of an airbag and/or failure (loss) of the master node), network 500 may change to a second state 514. In the second state 514, a node that in first state 512 was a slave node may assume the role of a master node. In other words, for example, if node 502 fails and/or is disabled, node 506, which is an antenna in this case, may assume the role of a master node. Stated yet another way, upon loss of master node 502, node 506 may be configured to operate as a fallback master node. In some embodiments the node 506 may be designated as a backup master node 516 during the first state 512. The designation of a backup master node 516 may prevent all of the remaining operation nodes from attempting to assume mastership at the same time.

In some embodiments, in addition to switching a master node, a network may be reconfigured with a different set of nodes. For example, if node 502 fails, node 506 may become the master node, and one or more other nodes may be disabled (e.g., to simply network 500 so that communication to a ground station (e.g., after an accident) is simplified and/or more reliable). In the example shown in FIG. 5, the node 504 (microphone) and the node 508 (speaker) may be disabled during the second state 514 to simplify communication to a ground station.

As previously discussed, if the previous master node (node 502 during the first state 512) fails or is disabled, another node (e.g., node 506 in the second state 514 of FIG. 5) may assume the role of the master node. In some embodiments a failure of the previous master node may be detected if a total number of beacon 238 signals the node 506 detects during a specific period of time falls below a predetermined range of values. This predetermined range of values may be selected based on the maximum bus cycle length 326 (FIG. 3).

Figure 6:
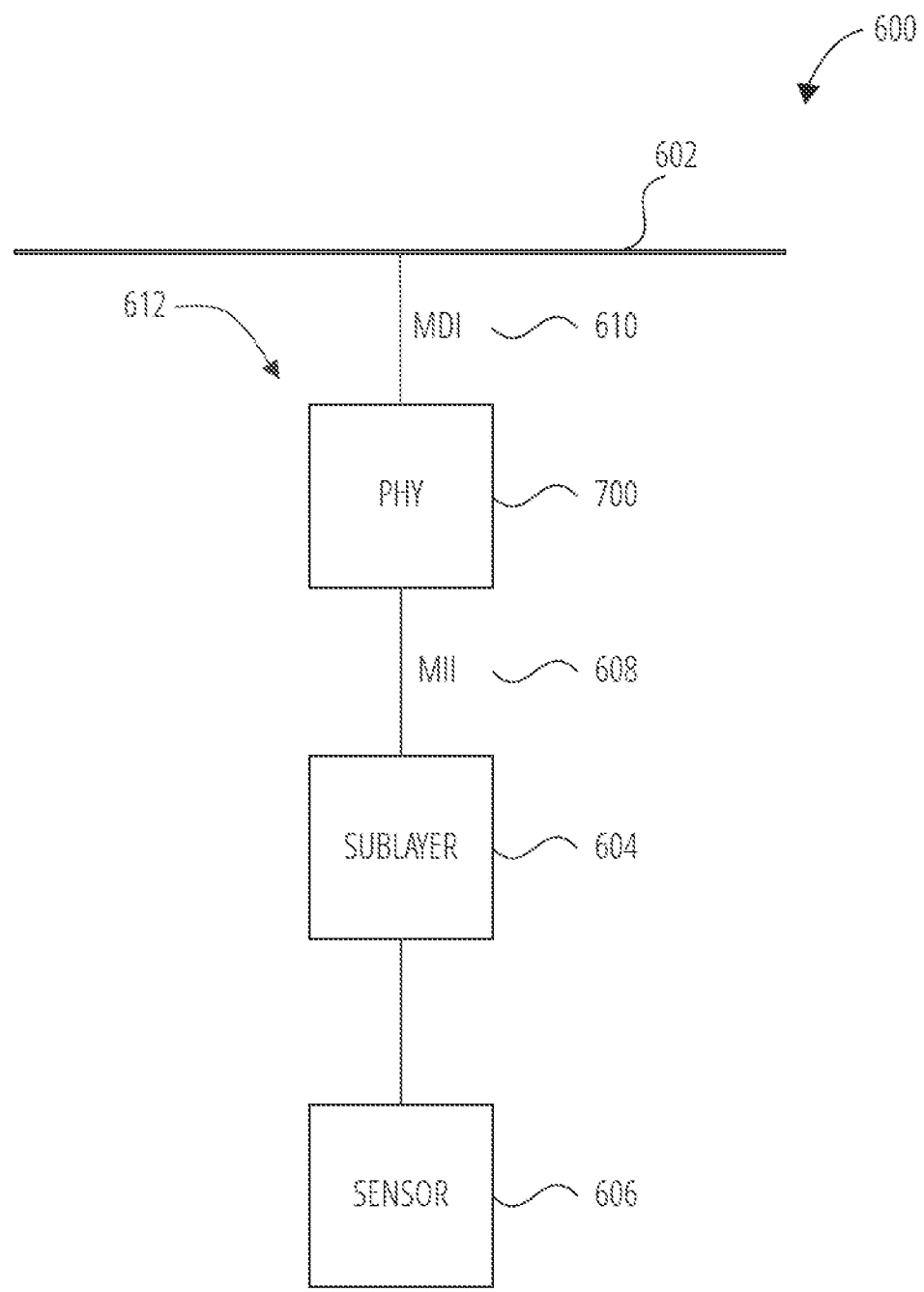
FIG. 6 depicts a system including a network and a node.

FIG. 6 depicts a system 600 including a network 602 (e.g., 10SPE network) and a node 612 including a physical layer (PHY 700), a sublayer 604, and a sensor 606. In some embodiments, one or more of the nodes of FIG. 5 (e.g., node 502, node 504, node 506, node 508, and node 510) may be implemented as shown for the node 612 of FIG. 6. For example, sublayer 604 may include a medium access control (MAC), a microcontroller (μC), and/or firmware (FW). As non-limiting examples, PHY 700 may interface with network 602 via a medium-dependent interface (MDI 610), and PHY 700 may interface with sublayer 604 via a media independent interface (MII 608).

Figure 7:
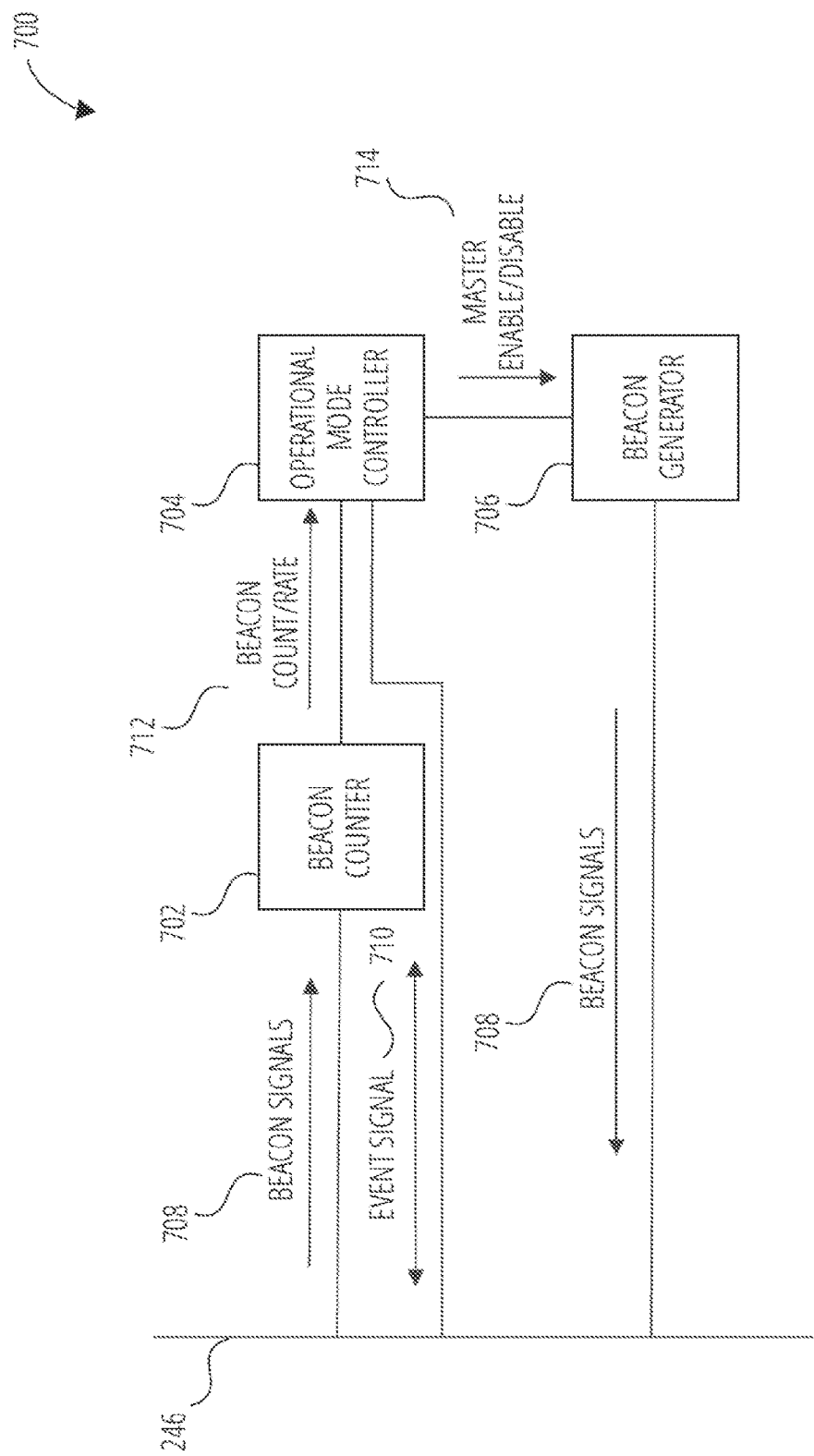
FIG. 7 is a block diagram of an example of a physical layer device (PHY) of FIG. 6, according to some embodiments.

FIG. 7 is a block diagram of an example of the PHY 700 of FIG. 6, according to some embodiments. FIG. 7 illustrates the PHY 700 operably coupled to the line 246 (e.g., the shared transmission medium 106). The PHY 700 includes a beacon counter 702 operably coupled to the line 246, an operational mode controller 704 operably coupled to the beacon counter 702, and a beacon generator 706 operably coupled to the operational mode controller 704 and to the line 246. The beacon counter 702 is configured to receive beacon signals 708 generated by a master node operably coupled to the line 246. In some embodiments, the beacon signals 708 are generated by the PHY 700 while the PHY 700 is operating as a master node of the network. In some embodiments, the beacon signals 708 are generated by another node while the other node is operating as a master node of the network and the PHY 700 is operating in a slave mode. The beacon counter 702 is configured to count a number of the beacon signals 708, and report a beacon count/rate to the operational mode controller 704 in a beacon count/rate signal 712. In some embodiments the beacon count/rate signal 712 may indicate a number of beacon signals 708 detected (e.g., during a predetermined period of time). In some embodiments the beacon count/rate signal 712 may indicate a rate of beacon signals 708.

The operational mode controller 704 is configured to receive the beacon count/rate signal 712 and determine whether the beacon count/rate falls within an acceptable range. The acceptable range may be determined based, at least in part, on a maximum bus cycle length (e.g., the maximum bus cycle length 326). For example, if the beacon count/rate is less than a number/rate that would be expected for maximum bus cycle lengths of each of the bus cycles, it may be determined that beacon signals 708 are not being transmitted on the line 246 at times when the beacon signals 708 should be transmitted. Accordingly, a minimum value of an acceptable range for the beacon count/rate may be determined based on the maximum bus cycle length.

While the PHY 700 is operating as the master node, the operational mode controller 704 may be configured to terminate operation of the PHY 700 as the master node responsive to an event. In some embodiments the event may include a failure in operation of the PHY 700 as the master node (e.g., responsive to a determination that the beacon count/rate indicated by the beacon count/rate signal 712 is outside of the predetermined acceptable range of values). In some embodiments the event may include a vehicle collision or other event, which may be signaled to the operational mode controller 704 with an event signal 710. In some embodiments the event signal 710 may include an airbag deployment signal. In some embodiments the event signal 710 may be provided to the PHY 700 from the line 246. In some embodiments the event signal 710 may be provided to the PHY 700 directly (e.g., directly from an airbag discharge device). The operational mode controller 704 is configured to transmit a master enable/disable signal 714 instructing the beacon generator 706 to terminate transmission of the beacon signals 708 to the line 246.

While the PHY 700 is operating as a slave node, the operational mode controller 704 may be configured to commence operation of the PHY 700 as the master node responsive to a determination that the beacon/count rate indicated by the beacon count/rate signal 712 is outside of the predetermined acceptable range of values. In some embodiments the operational mode controller 704 may only commence operation of the PHY 700 as the master node if the PHY 700 has been designated as a backup master node (e.g., by the current master node). For example, the operational mode controller 704 is configured to transmit a master enable/disable signal 714 instructing the beacon generator 706 to commence transmission of the beacon signals 708 to the line 246. The beacon generator 706 is configured to receive the master enable/disable signal 714, and transmit the beacon signals 708 to the line 246 or not transmit the beacon signals 708 to the line 246 responsive to the master enable/disable signal 714.

In some embodiments the operational mode controller 704 is configured to transmit an event signal 710 to the previous master node via the line 246 before controlling the PHY 700 to take over as the master node. The event signal 710 is configured to indicate to the previous master node that an event was detected, and that the previous master node is not operating properly as the master node. In some embodiments the operational mode controller 704 may transmit the event signal 710 to all of the other nodes connected to the line 246. In some embodiments the event signal 710 may indicate one or more of the previous master node and/or the other nodes that are to be disabled responsive to the event. In some embodiments the event signal 710 may indicate one of the nodes connected to the line 246 to take over as a fallback master node to be ready to take over as the master node responsive to a detection of failure or loss of the PHY 700 as master node. In some embodiments the operational mode controller 704 may be configured to control the PHY 700 to take over as the master node without transmitting an event signal 710. In some embodiments the operational mode controller 704 may be configured to receive an event signal 710 transmitted by another node of the network. For example, if the PHY 700 is operating as the master node and another node of the network detects a failure of the PHY 700 as the master node, the other node may transmit an event signal 710. In some embodiments the operational mode controller 704 is configured to disable operation of the PHY 700 as the master node responsive to receiving the event signal 710 by changing the state of the master enable/disable signal 714. Also, in some embodiments, the operational mode controller 704 may be configured to control the PHY 700 to operate as a fallback master node responsive to receiving an event signal 710 designating the PHY 700 as the fallback master node.

In some embodiments at least a portion of the PHY 700 may be implemented using electrical hardware (e.g., combinational logic). In some embodiments at least a portion of the PHY 700 may be implemented using one or more processors. In some embodiments at least a portion of the PHY 700 may be implemented using firmware and/or software.

Figure 8:
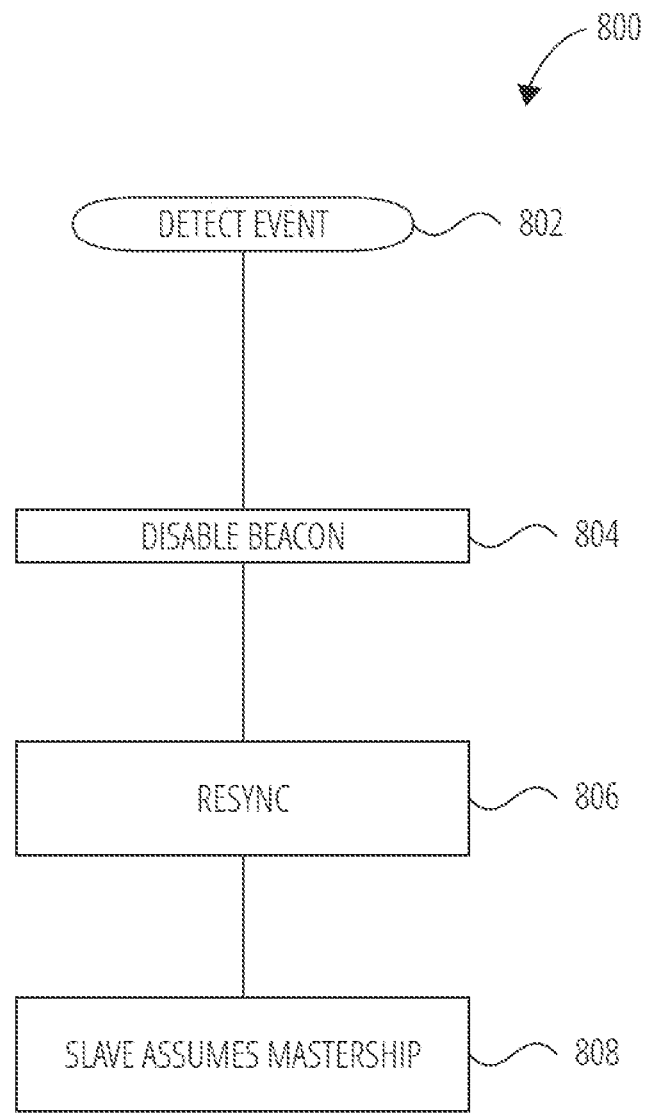
FIG. 8 is a flowchart illustrating an example method of operating a network such as a 10SPE network.

FIG. 8 is a flowchart illustrating an example method 800 of operating a network, such as a 10SPE network. Method 800 may be arranged in accordance with at least one embodiment described in the present disclosure. Method 800 may be performed, in some embodiments, by a device or system, such as network 500 (see FIG. 5), system 600 (see FIG. 6), one or more of the components thereof, or another system or device. In these and other embodiments, method 800 may be performed based on the execution of instructions stored on one or more non-transitory computer-readable media. Although illustrated as discrete blocks, various blocks may be divided into additional blocks, combined into fewer blocks, or eliminated, depending on the desired implementation.

Method 800 may begin at block 802, wherein an event in a network may be detected. In some embodiments the event may be detected indirectly by detecting an insufficient number of beacon signals over a period of time. In some embodiments the event may be detected more directly (e.g., via an airbag deployment signal). The event may include, for example, a change in an environment (e.g., a crash and/or an accident, loss of one or more nodes, without limitation, that causes an unexpected beacon count number) or other event that causes a detected rate or number of beacon 238 signals outside of a predetermined range of values. The event may be detected by a master node and/or a slave node. For example, a PHY of node 502 and/or a PHY of node 506 may detect a change in an environment or a rate or number of beacon 238 signals outside of a predetermined range of values. The change may include a count value of the number of detected beacon 238 signals not changing at an expected rate. Further, in some embodiments, the event may be communicated to a master node (e.g., master node 502 during first state 512 of FIG. 5).

At block 804, a beacon may be disabled responsive to the detected event, and method 800 may proceed to block 806. More specifically, for example, a beacon of the master node (e.g., master node 502 during first state 512 of FIG. 5) may be disabled. For example, the beacon of the master node may be disabled by the master node or another node. More specifically, for example, firmware of the master node may disable the beacon of the master node.

At block 806, each node in a network may be resynced, and method 800 may proceed to block 808. More specifically, for example, each PHY of each node in the network may enter a PLCA RESYNC state to resync each node in the network.

At block 808, a slave node (e.g., a fallback master node) may assume mastership of the network. In other words, the master ("mastership") may be changed from one node to another node. For example, slave node 506 (see FIG. 5) may assume a master role. Yet more specifically, for example, firmware of the slave node may set its PLCA ID to 0 to assume mastership.

Modifications, additions, or omissions may be made to method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 9:
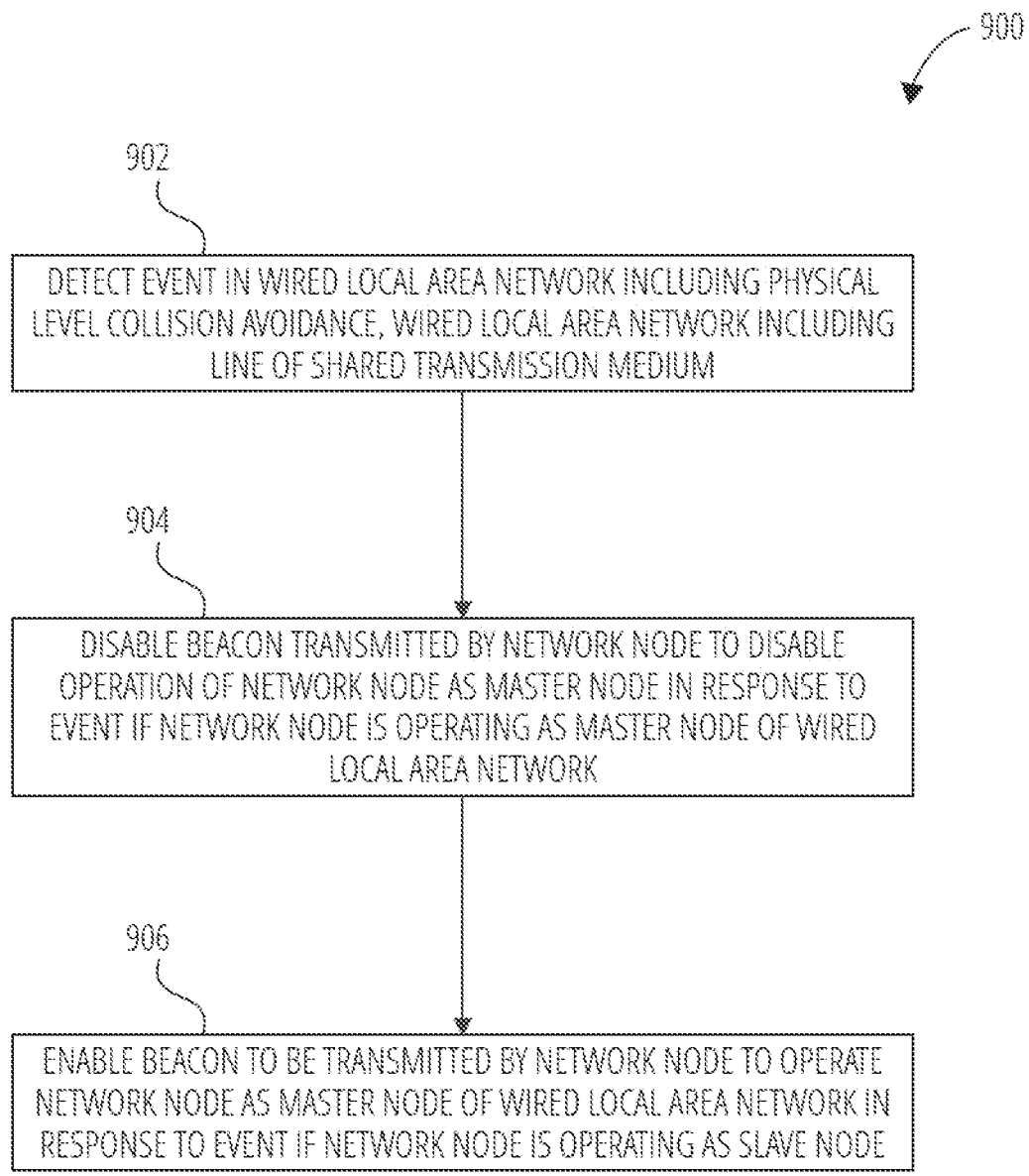
FIG. 9 is a flowchart illustrating an example method of operating a network node, according to some embodiments.

FIG. 9 is a flowchart illustrating an example method 900 of operating a network node, according to some embodiments. In block 902, method 900 detects an event in a wired local area network including physical level collision avoidance, the wired local area network including a line of a shared transmission medium. In block 904, method 900 disables a beacon transmitted by the network node, so as to disable operation of the network node as the master node, in response to the event if the network node is operating as the master node of the wired local area network. In block 906, method 900 enables the beacon to be transmitted by the network node, so as to operate the network node as a master node of the wired local area network, in response to the event if the network node is operating as a slave node (e.g., a fallback master node). In some embodiments the network node may take over operation as the master node and transmit the beacon in indirect response to the event. For example, the network node may take over operation as the master node responsive to a determination that the previous master node is not providing beacon signals at a sufficient rate (e.g., a count of beacons is lower than expected).

Figure 10:
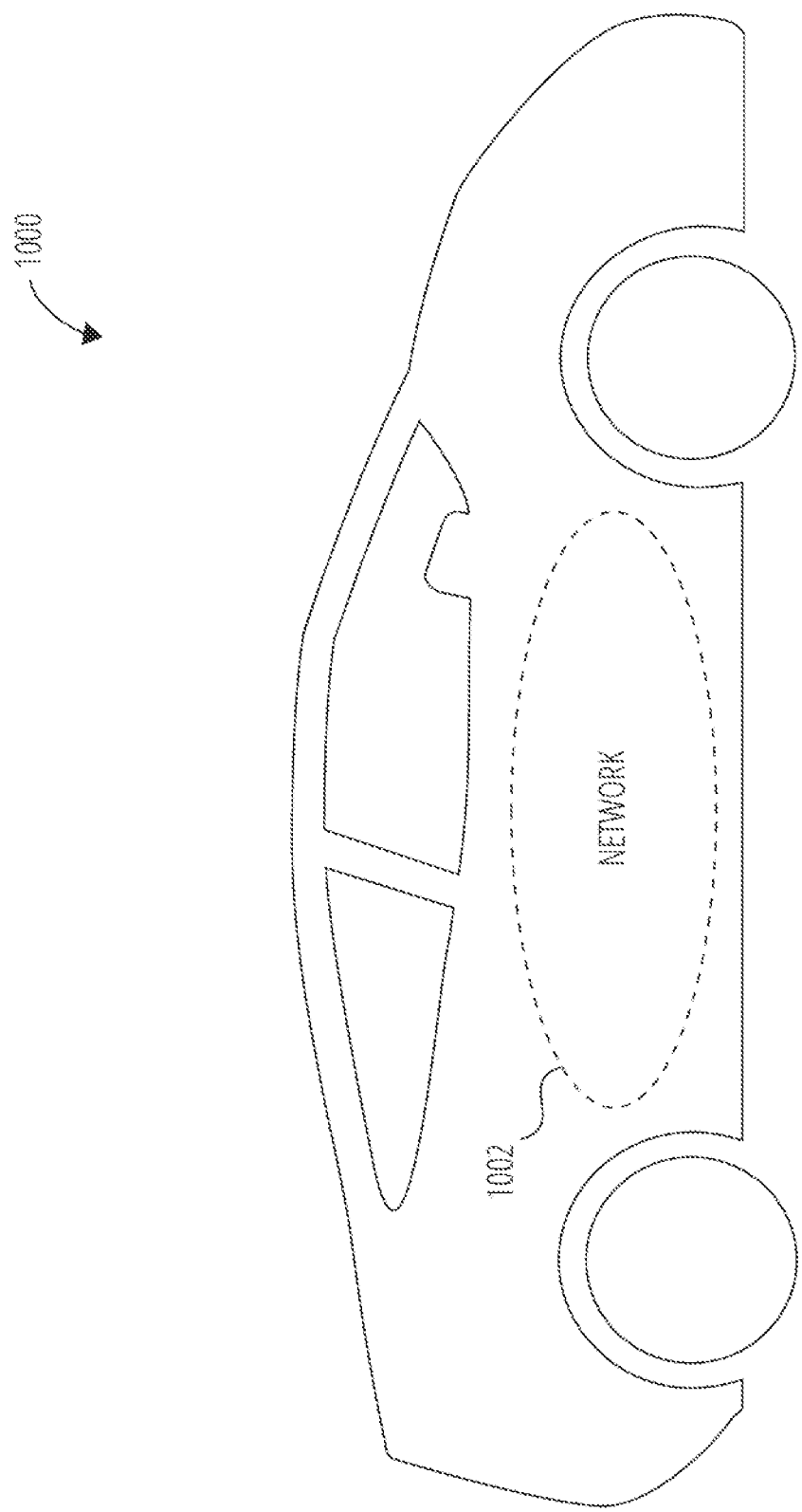
FIG. 10 depicts a vehicle including a network.

FIG. 10 depicts a vehicle 1000 (e.g., a truck, a bus, a ship, and/or an aircraft) including a network 1002 (e.g., a 10SPE network) having a number of nodes (e.g., amplifier(s), microphone(s), antenna(s), speaker(s), sensor(s), etc.). According to some embodiments, network 1002, which may also be referred to as a "vehicle network," includes a physical level collision avoidance (PLCA) sublayer. Further, in some embodiments, a first node (e.g., an amplifier) may be configured to operate as a master of the 10SPE network. In addition, a second node (e.g., an antenna) may be configured to assume mastership responsibilities from the first node in response to a detected event (e.g., a crash/accident or other master node disabling event involving vehicle 1000).

As described herein, one or more slaves (e.g., slave nodes) of a network may detect a failure of a PLCA master (e.g., by monitoring beacon count and/or other parameters (e.g., signal quality)). Further, a designated slave (e.g., a fallback master) may become (e.g., takeover) as the master (e.g., in response to failure of the master). More specifically, for example, based on a beacon count and possibly other status information (e.g., signal quality), a master of a network may be switched from one node to another node. Further, in some embodiments, the original master may be reconfigured as a slave node. As a more specific example, during a crash (e.g., involving a vehicle including a network), a master node may stop sending beacons, and an eCall node may detect, for example, a lack of change in beacon count, and take over as the master node.

Figure 11:
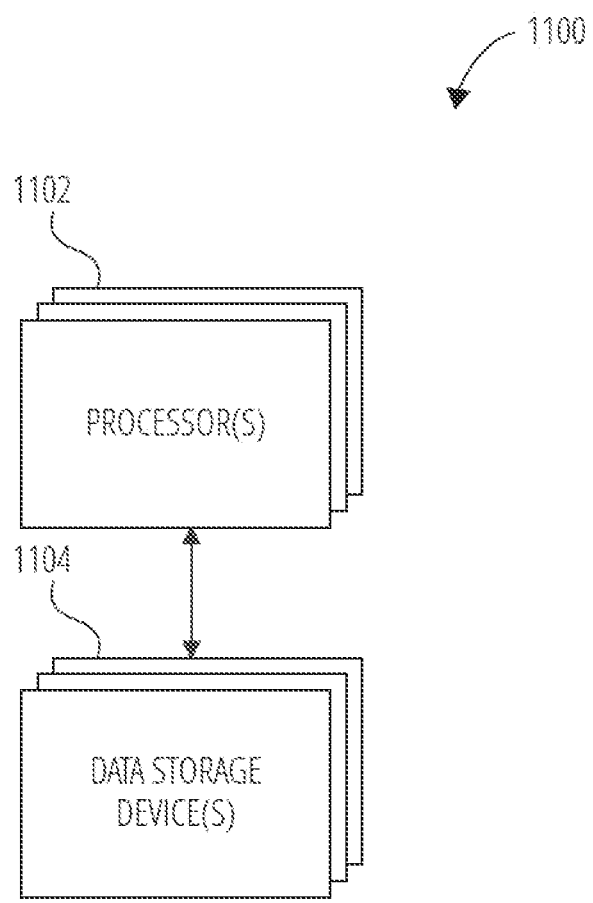
FIG. 11 is a block diagram of a computing device that may be used in some embodiments.

FIG. 11 is a block diagram of a computing device 1100 that may be used in some embodiments. The computing device 1100 includes one or more processors 1102 (sometimes referred to herein as "processor processors 1102") operably coupled to one or more data storage devices (sometimes referred to herein as "storage 1104"). The storage 1104 includes computer-readable instructions (e.g., software, firmware) stored thereon. The computer-readable instructions are configured to instruct the processors 1102 to perform operations of embodiments disclosed herein. For example, the computer-readable instructions may be configured to instruct the processors 1102 to perform at least a portion or a totality of the method 800 of FIG. 8 and/or the method 900 of FIG. 9. As another example, the computer-readable instructions may be configured to instruct the processors 1102 to perform at least a portion or a totality of the operations discussed for the nodes (e.g., node 502, node 504, node 506, node 508, or node 510) of FIG. 5; the network 602, the PHY 700, the sublayer 604, or the sensor 606 of FIG. 6; the beacon counter 702, the operational mode controller 704, the beacon generator 706 of FIG. 7; or the network 1002 of FIG. 10. As a specific, non-limiting example, the computer-readable instructions may be configured to instruct the processors 1102 to disable a master node (e.g., disable itself) responsive to detection of an event corresponding to failure of the master node. As another specific, non-limiting example, the computer-readable instructions may be configured to instruct the processors 1102 to control a physical layer device (e.g., PHY 700 of FIG. 6 and FIG. 7) to assume the role of master node responsive to detecting that an event corresponding to failure of the master node.

Various embodiments of the present disclosure may improving 10SPE robustness by detecting PLCA master failures and deploying fallback masters (e.g., for recovery and/or for eCall support).

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

EXAMPLES

A non-exhaustive, non-limiting list of example embodiments follows. Not each of the example embodiments listed below are individually indicated as being combinable with all others of the example embodiments listed below and embodiments discussed above. It is intended, however, that these example embodiments are combinable with all other example embodiments and embodiments discussed above unless it would be apparent to one of ordinary skill in the art that the embodiments are not combinable.

Example 1: A method, comprising: detecting an event in a 10SPE network including physical level collision avoidance (PLCA); disabling a beacon of a first node of the 10SPE network operating as a master of the 10SPE network in response to the event; and enabling a second node to operate as the master of the 10SPE network.

Example 2: The method of Example 1, wherein detecting the event comprises: monitoring a beacon count for the first node; and determining the first node has failed in response to the beacon being less than an expected count.

Example 3: The method according to any one of Examples 1 and 2, wherein disabling comprises disabling, via firmware of the first node, the beacon of the first node.

Example 4: The method according to any one of Examples 1-3, further comprising communicating the event to the first node.

Example 5: The method according to any one of Examples 1-4, wherein disabling the beacon of the first node comprises disabling the beacon of an amplifier.

Example 6: The method of Example 5, wherein enabling the second node comprises enabling an antenna to operate as the master.

Example 7: The method according to any one of Examples 1-6, further comprising disabling the first node and at least one other node of the 10SPE network in response to the event.

Example 8: A method, comprising: counting a number of beacons sent by a node operating as a master of a 10SPE network including physical level collision avoidance (PLCA); and in response to the number of beacons sent by the node being less than a threshold number, changing the master to another node of the 10SPE network.

Example 9: The method of Example 8, wherein counting the number of beacons sent by the node operating as the master comprises counting the number of beacons sent by an amplifier.

Example 10: The method according to any one of Examples 8 and 9, wherein changing the master to another node of the 10SPE network comprises changing the master to an antenna of the 10SPE network.

Example 11: The method of according to any one of Examples 8-10, further comprising, in response to the number of beacons sent by the node being less than a threshold number, disabling the node.

Example 12: The method of Example 11, further comprising, in response to the number of beacons sent by the node being less than the threshold number, disabling at least a third node of the 10SPE network.

Example 13: The method according to any one of Examples 8-12, wherein changing the master to another node of the 10SPE network comprises setting a PLCA identification (ID) of the another node to 0.

Example 14: A 10SPE network including physical level collision avoidance (PLCA), comprising: a first node configured to operate as a master of the 10SPE network; and a second node configured to assume mastership responsibilities from the first node in response to detecting an event.

Example 15: The 10SPE network of Example 14, wherein at least one of the first node and the second node is configured to cause one or more other nodes of the 10SPE network to go offline in response to the event.

Example 16: The 10SPE network according to any one of Examples 14 and 15, further comprising one or more other nodes configured to go offline in response to the event.

Example 17: The 10SPE network according to any one of Examples 14-16, wherein the second node is configured to count a number of beacons sent by the first node.

Example 18: The 10SPE network of Example 17, wherein the event is in response to the number of beacons sent by the first node being less than an expected number of beacons.

Example 19: The 10SPE network according to any one of Examples 14-18, wherein the event comprises at least one of a failure and a crash.

Example 20: A vehicle including a 10SPE network including physical level collision avoidance (PLCA), the vehicle comprising: an amplifier configured to operate as a master of the 10SPE network; and an antenna configured to assume mastership responsibilities from the amplifier in response to detecting an event.

Example 21: The vehicle of Example 20, wherein the event comprises a crash involving the vehicle.

Example 22: A physical layer device for a network node, the physical layer device comprising: a beacon counter operably coupled to a line of a shared transmission medium of a wired local area network including physical level collision avoidance, the beacon counter configured to count beacon signals on the line and determine a beacon count over a predetermined time period or a beacon rate of the beacon signals; and an operational mode controller configured to: determine whether the determined beacon count or the determined beacon rate falls within a predetermined acceptable range of values; and control the physical layer device to take over operation as a master node of the wired local area network responsive to a determination that the determined beacon count or the determined beacon rate falls outside of the predetermined acceptable range of values.

Example 23: The physical layer device of Example 22, wherein the operational mode controller is configured to control the physical layer device to take over operation as the master node only if the physical layer device has been designated as a fallback master node.

Example 24: The physical layer device according to any one of Examples 22 and 23, wherein the operational mode controller is further configured to disable a beacon transmitted by the network node to disable operation of the network node as the master node responsive to an event.

Example 25: The physical layer device of Example 24, wherein the event includes a vehicle collision.

Example 26: The physical layer device according to any one of Examples 22-25, wherein a minimum value of the predetermined acceptable range of values is determined based on a maximum bus cycle length of bus cycles on the line.

Example 27: A method of operating a network node, the method comprising: detecting an event in a wired local area network including physical level collision avoidance, the wired local area network including a line of a shared transmission medium; and enabling the beacon to be transmitted by the network node to operate the network node as a master node of the wired local area network in response to a determination that a beacon count over a predetermined time period or a beacon rate of a beacon signal is less than a predetermined minimum value if the network node is operating as a slave node.

Example 28: The method of Example 27, further comprising disabling a beacon transmitted by the network node to disable operation of the network node as the master node in response to the event if the network node is operating as the master node of the wired local area network.

Example 29: The method of Example 28, further comprising disabling at least one node responsive to disabling operation of the network node as the master node.

Example 30: The method according to any one of Examples 28 and 29, wherein the event comprises receipt of an event signal configured to signal the event.

Example 31: The method according to any one of Examples 28-30, wherein disabling the beacon comprises disabling the beacon via firmware of the network node.

Example 32: The method according to any one of Examples 27-31, wherein enabling the beacon to be transmitted by the network node to operate the network node as the master node in response to the event comprises transitioning from operating the network node as the slave node to operating the network node as the master node only if the network node was previously designated as a fallback network node.

Example 33: The method of Example 32, wherein transitioning from operating the network node as the slave node to operating the network node as the master node comprises transitioning from operating the network node as the slave node to operating the network node as the master node without intervention from a previous master node.

Example 34: The method according to any one of Examples 27-33, wherein detecting the event comprises: monitoring a beacon signal on the line to detect a beacon count or a beacon rate on the line; and determining that the master node has failed in response to the detected beacon count or the detected beacon rate falling outside of a predetermined acceptable range of values.

Example 35: The method of Example 34, wherein the detected beacon count or the detected beacon rate falling outside of a predetermined acceptable range of values comprises the detected beacon count or the detected beacon rate exceeding a maximum value of the predetermined acceptable range of values.

Example 36: The method of Example 34, wherein the detected beacon count or the detected beacon rate falling outside of a predetermined acceptable range of values comprises the detected beacon count or the detected beacon rate falling below a minimum value of the predetermined acceptable range of values.

Example 37: The method according to any one of Examples 27-36, further comprising communicating the event to a previous master node responsive to detecting the event.

Example 38: The method according to any one of Examples 27-37, further comprising disabling a previous master node and at least one other node of the wired local area network in response to the event.

Example 39: A wired local area network (WLAN) including physical level collision avoidance, comprising: a line of a shared transmission medium; a first node operably coupled to the line, the first node configured to operate as a master of the WLAN; and a second node configured to assume mastership responsibilities from the first node in response to detecting an event.

Example 40: The WLAN of Example 39, wherein the at least one of the first node and the second node is configured to disable one or more other nodes of the WLAN in response to the event.

Example 41: The WLAN according to any one of Examples 39 and 40, wherein the second node is configured to count a number of beacons sent by the first node.

Example 42: The WLAN of Example 41, wherein the event is in response to the number of beacons sent by the first node over a predetermined time period or a rate of beacons falling outside of a predetermined acceptable range of values.

Example 43: The WLAN according to any one of Examples 39-42, wherein the event comprises at least one of a failure of the first node and a crash of a vehicle including the first node.

Example 44: A vehicle including a wired local area network including physical level collision avoidance, the vehicle comprising: an amplifier configured to operate as a master of the WLAN, the WLAN including a shared transmission medium; and an antenna configured to assume mastership responsibilities from the amplifier in response to detecting an event.

Example 45: The vehicle of Example 44, wherein the event comprises a crash involving the vehicle.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An apparatus, comprising:
   a beacon counter operably coupled to a line of a shared transmission medium of a wired local area network, the beacon counter to count beacon signals on the line and determine a beacon count over a predetermined time period, or a beacon rate of the beacon signals; and
   an operational mode controller to control the apparatus to take over operation as a master node of the wired local area network based, at least in part, on a maximum bus cycle length of bus cycles on the line and responsive to the beacon count or the beacon rate.

2. The apparatus of claim 1, wherein the apparatus is a physical layer device.

3. The apparatus of claim 1, wherein the shared transmission medium comprises a single twisted pair of wires.

4. The apparatus of claim 1, wherein the operational mode controller is to terminate operation of the apparatus as the master node responsive to an event.

5. The apparatus of claim 4, wherein the event comprises a determination that the beacon count or the beacon rate is outside of a predetermined acceptable range of values.

6. The apparatus of claim 4, wherein the event comprises an indication by an airbag deployment signal that an airbag has been deployed.

7. The apparatus of claim 1, wherein the operational mode controller is to transmit an event signal to a previous master node via the line, the event signal to indicate to the previous master node that an event was detected and that the apparatus is taking over as the master node.

8. The apparatus of claim 7, wherein the event signal indicates another network node to take over as a fallback master node in case of a failure by the apparatus as the master node.

9. A method, comprising:
   counting beacon signals on a line of a shared transmission medium of a wired local area network;
   determining a beacon count over a predetermined time period or a beacon rate of the beacon signals; and
   taking over operation as a master node of the wired local area network based, at least in part, on a maximum bus cycle length of bus cycles on the line and responsive to the beacon count or the beacon rate.

10. The method of claim 9, wherein taking over operation as the master node comprises taking over operation as the master node responsive to the beacon count over the predetermined time period being less than a number of bus cycles having the maximum bus cycle length that would fit within the predetermined time period.

11. The method of claim 10, comprising disabling a beacon signal of a previous master node responsive to the beacon count over the predetermined time period being less than the number of bus cycles having the maximum bus cycle length that would fit within the predetermined time period.

12. The method of claim 10, comprising resynching network nodes of the wired local area network responsive to the beacon count over the predetermined time period being less than the number of bus cycles having the maximum bus cycle length that would fit within the predetermined time period.

13. The method of claim 10, comprising transmitting the beacon signals to the line as the master node responsive to taking over the operation as the master node.

14. A system, comprising:
   a line of a shared transmission medium of a wired local area network; and
   a plurality of network nodes in electrical communication with the line, at least a first network node of the plurality of network nodes to operate as a master node of the wired local area network, at least a second network node of the plurality of network nodes to take over operation as the master node of the wired local area network based, at least in part, on a maximum bus cycle length of bus cycles on the line and responsive to a beacon count over a predetermined time period or a beacon rate of a beacon signal.

15. The system of claim 14, wherein the wired local area network is a vehicle network of a vehicle.

16. The system of claim 14, wherein the second network node is to take over operation as the master node responsive to an airbag deployment signal.

17. The system of claim 14, wherein at least one of the plurality of network nodes includes an amplifier.

18. The system of claim 14, wherein at least one of the plurality of network nodes includes a microphone.

19. The system of claim 14, wherein at least one of the plurality of network nodes includes an antenna.

20. The system of claim 14, wherein at least one of the plurality of network nodes includes a speaker.

* * * * *

UNITED STATES PATENT AND TRADEMARK OFFICE
CERTIFICATE OF CORRECTION

PATENT NO. : 11,876,616 B2
APPLICATION NO. : 17/815521
DATED : January 16, 2024
INVENTOR(S) : Michael Rentschler et al.

It is certified that error appears in the above-identified patent and that said Letters Patent is hereby corrected as shown below:

In the Specification

Column 1, Line 9, change "11,405,127, issue Aug. 2, 2022," to --11,405,127, issued Aug. 2, 2022,--

Signed and Sealed this
Thirtieth Day of April, 2024

Katherine Kelly Vidal
*Director of the United States Patent and Trademark Office*